United States Patent [19]

Lacagnina

[11] Patent Number: 6,098,686
[45] Date of Patent: Aug. 8, 2000

[54] APPARATUS FOR MANUFACTURING A TIRE HAVING THE SIDEWALLS ENDS OVERLAPPING THE ENDS OF THE TREAD BAND

[75] Inventor: Claudio Lacagnina, Busto Arsizio, Italy

[73] Assignee: Pirelli Coordinamento Pneumatici SPA, Milan, Italy

[21] Appl. No.: 09/151,700

[22] Filed: Sep. 11, 1998

Related U.S. Application Data

[62] Division of application No. 08/899,267, Jul. 23, 1997, Pat. No. 5,851,329.

[30] Foreign Application Priority Data

Jul. 31, 1996 [IT] Italy ................................. MI96A1650

[51] Int. Cl.⁷ .................................................. B29D 30/30
[52] U.S. Cl. ........................ 156/400; 156/403; 156/421.4
[58] Field of Search ................... 156/111, 130.3, 156/130.7, 132, 133, 400–403, 412, 421, 421.4, 406.2, 123, 395, 396

[56] References Cited

U.S. PATENT DOCUMENTS

| | | | |
|---|---|---|---|
| 3,728,194 | 4/1973 | Enders | 156/400 |
| 4,006,766 | 2/1977 | Takayanagi et al. | |
| 4,923,553 | 5/1990 | Nishide et al. | 156/401 |
| 5,087,316 | 2/1992 | Sumiuchi et al. | 156/396 |
| 5,380,384 | 1/1995 | Tokunaga et al. | 156/111 |
| 5,746,860 | 5/1998 | Moriyama | 156/111 |

FOREIGN PATENT DOCUMENTS

| | | |
|---|---|---|
| 8810782 | 3/1983 | Australia . |
| 340146 | 11/1989 | European Pat. Off. . |
| 613767 | 9/1994 | European Pat. Off. . |
| 2376762 | 8/1978 | France . |
| 2195959 | 4/1988 | United Kingdom . |

*Primary Examiner*—Geoffrey L. Knable
*Attorney, Agent, or Firm*—Stevens, Davis, Miller & Mosher, LLP

[57] ABSTRACT

A method and apparatus for manufacturing a tire in which the sidewalls overlap the ends of the tread band. The method comprises the steps of inserting an extensible tubular releasing element around the carcass plies at each end of an assembly drum, wrapping the sidewalls on these elements, applying another tubular element on the sidewalls, and overturning the tubular elements to spread apart the sidewalls in an open position aside of the assembly drum. The carcass, in the form of a first-step cylindrical sleeve comprising open sidewalls, is transferable to a (second-step) forming drum to be torically formed against a separately prepared assembly comprising the belt pack and the tread band. Next, the band ends are turned down onto the toric carcass and the sidewalls are folded back against the carcass and over the ends of the tread band.

8 Claims, 3 Drawing Sheets

APPARATUS FOR MANUFACTURING A TIRE HAVING THE SIDEWALLS ENDS OVERLAPPING THE ENDS OF THE TREAD BAND

This is a division of application No. 08/899,267, filed Jul. 23, 1997, now U.S. Pat. No. 5,851,329.

FIELD OF THE INVENTION

The present invention relates to a method for manufacturing a tire and, more specifically, to a method for manufacturing a tire having sidewalls enclosing the ends of the tread band, as well as to an apparatus for carrying out this method and to a tire thus produced.

BACKGROUND OF THE INVENTION

As is known, a tire essentially comprises a carcass including at least one reinforcing ply, a couple of bead wires around which the ply edges are folded back in loop form after interposition of an elastomeric filling fixed to the radially external surface of each bead wire, a belting structure arranged as a crown around the torically formed carcass, a tread band wrapped around the belt, and a couple of axially opposed sidewalls, radially extending between the bead wires and the tread band.

Some kind of tires have the side portions of the tread band arranged over the radially external end of the sidewalls, while in other kinds the upper ends of the sidewalls are overlapped on the ends of the tread band.

A conventional tire manufacturing method substantially comprises the steps of wrapping at least one carcass ply around a cylindrical assembly drum having a radially external surface connected to corresponding axially external side surfaces, perpendicular to the drum rotation axis, through two curvilinear connecting surfaces, preferably arc-shaped in transversal cross-section, said ply having a width greater than that of the drum; turning down the edges of the ply radially inwardly onto the drum side surfaces, fixing the bead wires, optionally already assembled with the corresponding filling, against the carcass ply edges at said side surfaces of the drum, folding back the carcass ply edges in loop form radially outwardly around the bead wires and against the carcass ply, preferably until they reach and cover a portion of the ply lying on the cylindrical surface of the drum, wrapping around the side portions of the carcass ply, on the cylindrical portion, the corresponding sidewall of the tire with the axially external edge laterally protruding from the drum for a part sufficient to reach the bead wire zone, pressing the sidewall against the carcass ply to produce in this manner a semi-finished product commonly known as a cylindrical carcass sleeve.

Subsequently, the above mentioned sleeve is withdrawn from the assembly drum (or first-step drum) after contraction of the drum and fitted onto a toric forming drum of the expanding type (or second-step drum) to associate the same with the belt pack and the tread band which were separately preassembled on an auxiliary assembly drum.

To implement this second operating step, after fitting the sleeve onto the forming drum the belt/tread band assembly is placed around the sleeve in coaxial alignment with its center-line plane (or equatorial plane of the tire) and air is fed under pressure into the sleeve to torically form the same until the crown zone of the sleeve is brought against the belt pack.

Subsequently, the coupling between the sleeve and the belt/tread assembly is improved with appropriate pressing means to provide a green tire which will then be inserted in a mold to form the tread pattern and vulcanize the tire.

It is commonly known and in any case clear from the above that in the case of tires provided with sidewalls closed on the ends of the tread band the method described above requires modification to allow pressing of the tread band against the carcass ply before the sidewalls are overlapped on the side portions of the tread band.

In practice, the following procedure is followed. In the step of connecting the sidewalls to the cylindrical carcass sleeve an anti-adhesive element, usually a strip of sheet material (e.g. polyethylene), is preliminarily wound around the carcass ply towards each end of the drum for a portion of predetermined width so as to prevent adhesion of the ply to the entire surface of the sidewalls which are subsequently overlapped around each anti-adhesive element with their axially internal edge on said anti-adhesive element, while taking care that the sidewall portion between their axially external edge and the axially external edge of the anti-adhesive element be wide enough to ensure adhesion of the sidewall to the carcass in order to prevent relative sliding between the sidewall strip and the carcass ply during rotation of the assembly drum.

Next, after jointing together the ends of the sidewall portion deposited on the carcass and pressing the zone of the axially external edge of the sidewall against the carcass ply, said sleeve is removed from the assembly drum and fitted on the forming drum (i.e. the second-step drum), wherein the anti-adhesive element interposed between the sidewall and the carcass is withdrawn. This withdrawal is necessary to be able to associate the corresponding axially internal surface of the sidewalls with the carcass ply and over the side surfaces of the tread band.

The operation is manually or mechanically carried out primarily by gradually spreading apart the sidewalls from the carcass sleeve and then by removing the anti-adhesive element: preparation and subsequent rolling of the belt/tread assembly against the carcass ply are then performed and, lastly, the sidewalls are overturned from the spread-apart position to a closed position against the carcass ply and the ends of the tread band.

The method described is a source of a number of considerable shortcomings: in the first place, the step of spreading apart the carcass sidewall involves a radial stretching of the sidewall, perpendicularly to the tire rotation axis, with ensuing harmful dimensional variations of the semi-finished product, due to the plasticity of the material in the green state, which are very serious and sometimes unacceptable when the spreading operations of the sidewall are carried out manually. More particularly, the sidewall takes on an irregular wavy configuration predominantly concentrated along its periphery.

In addition, after the spreading apart operations, the free part of the sidewall no longer supported by the carcass wall in toric configuration, tends, due to its memory, to gradually return to a configuration free from internal stresses, i.e. a configuration corresponding to the deposition diameter of the sidewall onto the cylindrical surface of the assembly drum.

Consequently, there is a tendency of the radially external sidewall edge to curl axially outwardly on itself and against the radially internal portion which is already permanently fixed to the carcass ply and in any case to take on an irregular geometrical configuration in an axial direction.

This fact prevents the subsequent overturning of the sidewall in extended form against the carcass and the side portions of the tread band.

The operation is normally performed either manually or with the aid of rollers or through expansion of two small inflatable chambers arranged aside of the forming drum which, in their expansion, come into contact with the sidewall guiding its overturning against the carcass. In the situation just described, the sidewall overturning operation often originates a further undesired folding of the sidewall and in any case consolidates the curling and folding which may have possibly formed, which must be eliminated by using specific manual work with resulting cost increases of the manufacturing method and quality deterioration of the finished product.

Lastly, the removal of the anti-adhesive element, in particular when this is a thin sheet of plastics such as a strip of polyethylene is one of the most delicate operations in the tire manufacture, up to the point that the final result of this removal can determine the acceptability of the tire.

Indeed, it is to be noted that the anti-adhesive element is inserted between the sidewall and the carcass ply and thus creates with its radially internal edge the weld line between the sidewall and the carcass so that it may turn out to be as clamped between these elements.

In the removal step of the element consisting of the above mentioned sheet the forces applied by the operator may cause by tearing an entrapment of small sheet scraps between the sidewall and the carcass: the result is a welding failure between the rubber compositions separated by these scraps during the subsequent vulcanization step of the tire. The ensuing detachments in the tire may cause during operation a rapid destruction of the tire.

A last but no less important drawback, is that the generalized use of anti-adhesive elements of undegradable and unrecyclable materials, such as e.g. polyethylene, causes problems of environmental pollution due to the wasting of numberless releasing strips no longer reusable in the indicated production method.

SUMMARY OF THE INVENTION

The manufacturing method of the present invention is specifically directed to manufacturing the type of tire described above and to solving the problems set forth above.

The aim of the present invention is to provide a method for manufacturing a tire of the type having sidewalls overlapping the side portions of the tread, capable to achieve greater automation of the manufacturing cycle with reduced manufacturing costs, high quality of the finished product, without the risk of trapping incompatible materials within the tire body and discharging non-reusable service materials.

In a first aspect, the present invention relates to a method for manufacturing a tire having the sidewall ends overlapping the ends of the tread band starting from a cylindrical sleeve-shaped tire carcass comprising at least one carcass ply provided with reinforcing cords having respective ends each folded back around at least one circumferentially inextensible bead wire and a tire sidewall fixed on each side portion of said sleeve, said method comprising the steps of:

wrapping at least one carcass ply around an assembly drum having a radially external cylindrical surface connected to corresponding radially external side surfaces through two curvilinear surfaces, said carcass ply having a width greater than the width of said drum, radially and inwardly turning down the edges of the ply onto said side surfaces of the drum, fixing said bead wires against said edges of the carcass ply at said side surfaces, folding back the edges of the carcass ply in loop form radially and outwardly around the bead wires and against the carcass ply, arranging an anti-adhesive element around the side portions of said carcass ply on the cylindrical portion and for a part of predetermined width, wrapping around each anti-adhesive element the corresponding sidewall of the tire with the axially internal edge on said anti-adhesive element and with the axially external edge laterally protruding with respect to the corresponding axially external edge of said anti-adhesive element, pressing the portion of said sidewall laterally protruding from the axially external edge of the anti-adhesive element against the corresponding ply portion and/or folded back ply portion of the carcass ply, and withdrawing said cylindrical sleeve carcass from said assembly drum for further finishing operations of the tire, said method being characterized in that it makes use as the anti-adhesive element of a first tubular element, coaxial with said drum, radially extensible and axially inextensible, axially movable in both directions from a first position away from said drum to a second position wherein it fits thereon.

Preferably, this method comprises the additional step carried out before withdrawing said sleeve from said drum, of drawing the axially internal edge of said first tubular element axially and outwardly until said sidewalls are completely spread apart from said carcass.

Still more preferably, this method is characterized in that additional anti-adhesive means are arranged on the outer surface of said sidewalls, said additional anti-adhesive means comprising a second tubular element which is radially extensible and longitudinally inextensible, axially movable in both directions from a first position away from said drum to a second position wherein it fits thereon.

Again preferably, the method is characterized in that the sidewalls and the carcass ply are made mutually integral before rotating the drum in a known manner to wrap the sidewalls onto said sleeve.

This step may be conveniently carried out with removable clamping means in the form of clamps and the like, arranged at least in two axially opposed positions of the drum revolution surface. Advantageously, the clamping means ensure freedom from relative slipping between the tubular element and the sidewall during the wrapping step of the sidewalls onto the sleeve surface.

In a preferred embodiment, the method is characterized in that said first tubular elements are fitted on said drum by bringing the axially-free external edge of said tubular elements at the curvilinear connecting surfaces between said radially external cylindrical surface and the corresponding axially external surfaces of said drum.

In another aspect, the present invention relates to an apparatus for manufacturing a cylindrical sleeve-shaped tire carcass, as described above, comprising an assembly drum, rotating around its own axis, having a radially contractable radially external cylindrical revolution surface connected to two axially opposed external side surfaces through two curvilinear surfaces, means for turning down and folding back the ends of said plies on said side surfaces and means for setting bead wires against said side surfaces, which is characterized in that it comprises aside of each drum end at least a first anti-adhesive element, comprising a tubular part having a maximum diameter equal to the drum diameter, coaxial with said drum, open as a funnel at one end, at least one annular flange, coaxial with the drum, having an internal diameter greater than the diameter of said drum, rotatably connected to the drum and axially movable in both directions with respect thereto, said annular flange being connected with the funnel-shaped end of said element, and means for axially moving said flanges.

Preferably, the apparatus is characterized in that it comprises, for each end of said drum, a couple of said tubular elements, coaxial and concentric with one another, each connected to a corresponding annular flange: each element, having a funnel-shaped tubular form and unbroken surface, is conveniently made of an anti-adhesive material having extensibility characteristics in a circumferential direction and inextensibility characteristics in an axial direction ensured by reinforcing means incorporated and appropriately positioned in said tubular elements.

In a first embodiment, the above mentioned element is made of a rubberized fabric cylinder reinforced with threads selected from the group comprising monofilaments, elementary threads and reinforcing cords, either textile or metallic, arranged in a mutually parallel manner according to the generating line of said cylinder.

In an alternative embodiment, the above mentioned element is made of a rubber tube incorporating reinforcing fibers selected from the group comprising axially-oriented textile, metallic or glass fibers.

In a different aspect, the present invention also relates to a tire for vehicle wheels comprising a torically shaped carcass, provided in a radially internal position with beads for anchoring to a corresponding mounting rim, a tread band crown-arranged around the carcass having ends welded to the underlying carcass ply and a couple of axially opposed sidewalls, extending in radial direction from the zone of the bead wires up a zone wherein they cover the side ends of the tread band, characterized in that said sidewalls have been folded back against said side ends of the tread band by the method of the present invention.

BRIEF DESCRIPTION OF THE DRAWINGS

The present invention will be anyhow better understood with the aid of the following description as well as of the annexed drawings, given below by way of non-limiting illustration, in which.

BRIEF DESCRIPTION OF THE PREFERRED EMBODIMENTS

Figure 1:
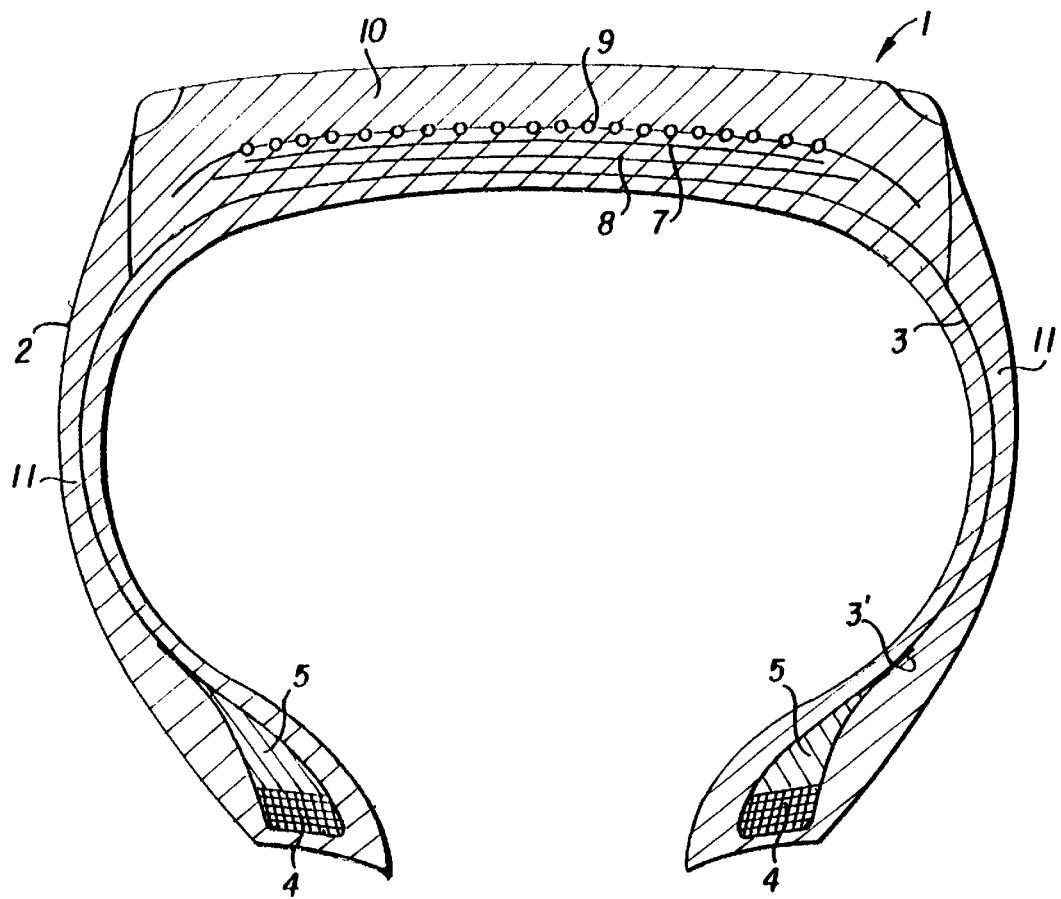
FIG. 1 shows a cross section of a tire according to the prior art wherein the side portions of the tread band are enclosed between the upper ends of the sidewalls.

To better clarify the following description, FIG. 1 initially illustrates the type of tire which may specifically be made by the manufacturing method of the present invention; this tire comprises a torically-shaped carcass 2 comprising at least one reinforcing ply 3, the edges 3' of which are folded back in loop form around usual bead reinforcement wires 4.

Rubber fillers 5 are arranged in a known manner between the ply 3 and the associated folded back edges 3'.

For the purposes of the present invention, the carcass may indifferently be either of the radial type or of the crossed-ply type.

The tire 1 also comprises, crown-arranged around the carcass 2, a tread band 10 the ends of which are welded to the underlying carcass ply. Inserted between the carcass and the tread band a belt pack may be provided, consisting of at least two radially superimposed belt strips, 7, 8, provided with parallel reinforcing cords in each strip and inclined with respect to the equatorial plane of the tire, preferably symmetrically crossed with one another and preferably reinforced by a further radially external layer 9 with circumferentially-oriented reinforcing cords. All the used materials are conventional and may be selected by the skilled in the art on the basis of specific needs with reference to the type of tire and its performance, so that they are not further described.

The carcass is additionally provided with a pair of axially opposed sidewalls 11 extending in radial direction from the bead zone (from the bead wires) to cover the side ends of the tread band 10.

The method for manufacturing a radial tire of the type illustrated has already been described in the introductory part of this description, so that specific reference is made hereinafter only to the modifications introduced in accordance with the present invention.

Figure 2:
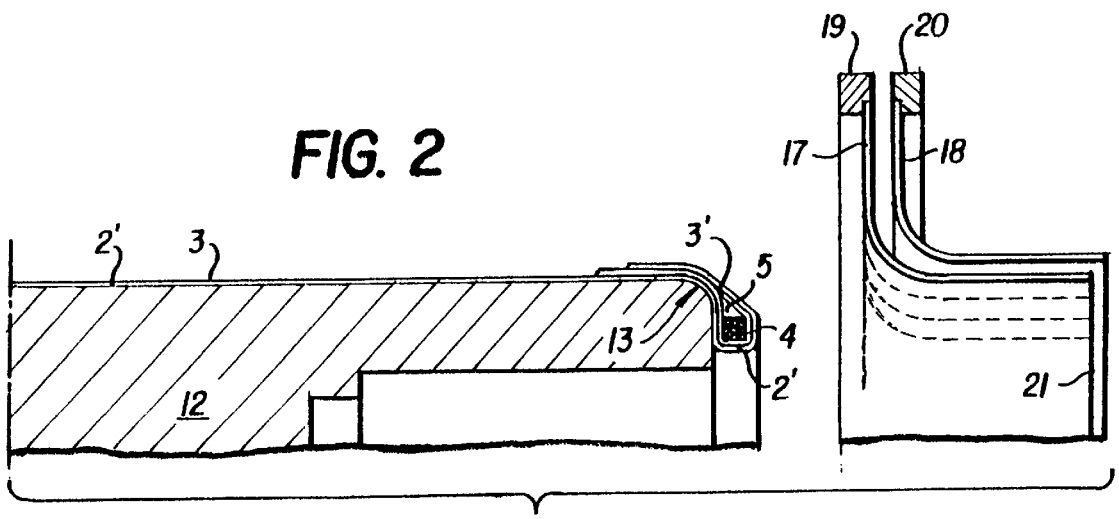
FIGS. 2 through 8 show partial cross sections of a known assembly drum on which a tire carcass sleeve manufactured in accordance with the method of the present invention is being completed with the aid of the new apparatus with releasing tubular elements.

In greater detail, FIG. 2 shows an assembly drum 12 also know as first-step drum, having a radially external cylindrical revolution surface, radially contractable for disengaging the carcass sleeve built on the drum. For the sake of simplicity, the drawing figures illustrating the different operating steps show partial cross sections, both axial and radial, of the assembly devices and of the tire being manufactured and do not illustrate the common frame, i.e. the apparatus, on which the above mentioned devices and the related acting means are mounted.

The cylindrical surface of the assembly drum 12 is connected to the two axially external side surfaces, generally at right angles to the drum rotation axis, also defined hereinbelow as drum shoulders, through two curvilinear surfaces each preferably shaped according to an arc having radius "r".

In accordance with the invention, aside of each end of drum 12 is arranged an annular flange, preferably a pair 19, 20 of annular flanges, coaxial with the drum 12 and having an internal diameter greater than that of the drum, synchronously rotating and separately axially movable in both directions with respect thereto.

Each flange is integral with one end of a tubular element 17, 18 free at the other end and is fixed to a means for axial movement.

The tubular elements 17, 18 are coaxial and concentric with one another and comprise a geometrical figure identified by a tubular portion having a diameter substantially equal to the drum diameter, which at one end opens like a funnel to engage with one of the above mentioned flanges.

For the sake of simplicity, in the drawing figures the means for the axial movement of the flanges are not shown since they are of known type and in an case readily determinable by one skilled in the art: for example, they may consist of an apparatus with cylinder and piston with hydraulic or pneumatic control, having the function of displacing each flange and, along therewith, the related tubular element, either towards the assembly drum or towards the opposite direction.

Each element has a tubular and funnel-like shape with unbroken surface and is made of an anti-adhesive material with elasticity characteristics in the circumferential direction but substantially inextensible in the axial direction, for the purpose of being able to expand for wrapping up, optionally under pressure if desired, cylindrical bodies placed therein and to withstand longitudinal traction without elongation.

The aforementioned tubular elements are preferably made of rubber having anti-adhesive characteristics with respect to the materials of the tire carcass with which they will be in contact, e.g. with silicone-based rubber compositions, and preferably incorporate continuous or discontinuous reinforcement means arranged in such a way as to provide the above-mentioned circumferential extensibility and axial inextensibility.

In a preferred embodiment, the anti-adhesive element is made of a cylinder of rubberized fabric, reinforced with threads selected from either textile or metallic monofilaments, elementary threads and cords mutually arranged in parallel with one another and essentially in accordance with the generating line of the cylinder. Those skilled in the art will have no difficulty in choosing any other reinforcing element which appears to be most suited to his specific requirements.

Optionally, the reinforcing elements may not be incorporated in the tubular element and in a different embodiment they can be present on one or both the surfaces of the tubular element, preferably also acting as anti-adhesive elements.

In another alternative embodiment, the element may be made of a rubber tube incorporating as reinforcing elements, e.g. textile, metallic or glass fibers, preferably oriented in an axial direction, uniformly distributed in the tube wall.

The thickness and/or quantity of said reinforcing means is determined as a function of the stresses to which the element might be subjected in operation and, more specifically, of the tensile stress to which it will undergo during the manufacturing steps of the carcass sleeve.

FIG. 2 also shows the cylindrical carcass sleeve during its assembly on the drum 12 according to the procedures discussed above.

In practice, a sheet of impermeable rubber 2' and at least one carcass ply 3, optionally preassembled together, are wrapped by rotating the drum onto the cylindrical drum surface; the impermeable sheet, usually called 'liner', has the function of ensuring air tightness in the finished tire of the so-called tubeless type, i.e. those which are used without inner tubes.

Next, through a folding apparatus, not shown being known per se, the ply edges protruding from the drum are turned down radially and inwardly on the shoulders 13 of the above mentioned drum: then through a bead-wire setting apparatus, known per se and not shown, the assembly comprising the bead wire 4 and the rubber filling 5 mounted on its radially external surface is pressed against the carcass ply at the drum shoulder 13.

Finally, the edges 3' of the ply 3 are folded back in loop form radially from the inside outwardly around the bead wire and its filling, preferably up to covering part of the carcass ply at the central cylindrical portion of the drum.

It is clear that the bead zone may comprise other structural elements, such as loops, edges and additional reinforcements, all known per se, which are not described here bearing no influence with respect to the present invention.

Figure 3:
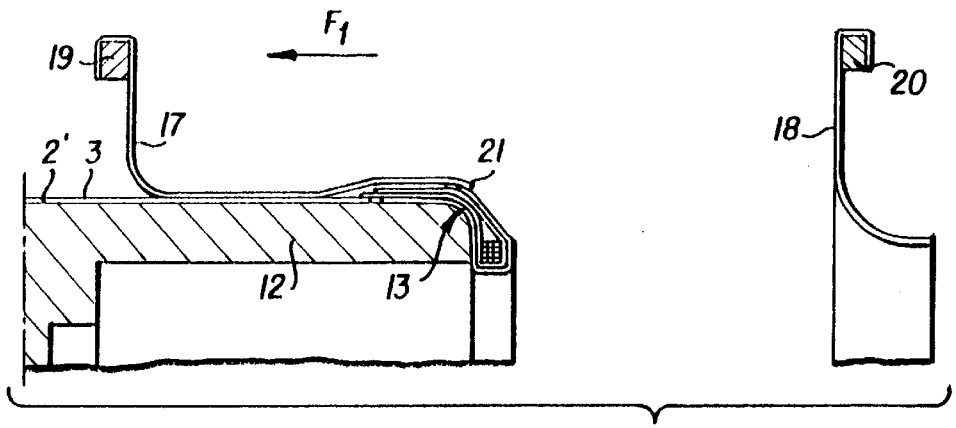

Now the strips of elastomeric material constituting the tire sidewalls are mounted on the cylindrical sleeve. According to the present invention, to implement this step the axially most inward flange 19 is axially moved along (FIG. 3) the direction of arrow F1, around the assembly drum thus dragging the tubular element 17 onto the carcass sleeve, continuing the movement at least until the axially external edge 21 of said element is also correctly positioned on the sleeve as explained below.

Since the internal diameter of the tubular element is selected so as to have a value proximate to but not greater than that of the assembly drum diameter, the element slightly expands, point by point, in relation to the thickness of the sleeve fitted on the drum, which is variable from a minimum at the cylindrical portion of the carcass ply up to a maximum at the ply folds and thus wraps up the sleeve with a slight pressure. Preferably, the expansion values of the element do not exceed 10% of its circumferential development.

Still more preferably, the above mentioned axial movement in relation to the length of the tubular element continues until the free end 21, i.e. the axially external edge of the element, reaches the connecting arc 14 between the cylindrical surface and the drum shoulders.

The length of the cylindrical part of the tubular element, i.e. of the tubular element part between the beginning of the funnel-shaped portion—connecting the element to the corresponding displacing flange—and the axially external edge, allows to use said tubular element with different widths of the tire sidewalls, in such a way that it does not require its substitution along with the size of the tire being built, as will be clarified hereinbelow.

Preferably, the position of the above mentioned edge 21 of the tubular element is identified by the intersection of the surface of the connecting arc 14 with the conical surface defined by the radius of said arc 14 when the angle α between the drum rotation axis and the radius, i.e. the cone opening, is between 0° and 90°.

Preferably, the angle α is between 15° and 60° and, still more preferably, is equal to 45° in such a manner that after overturning the arrangement of the sidewall aside of the drum keeps the same diameter value of its configuration upon deposition on the drum.

Figure 4:
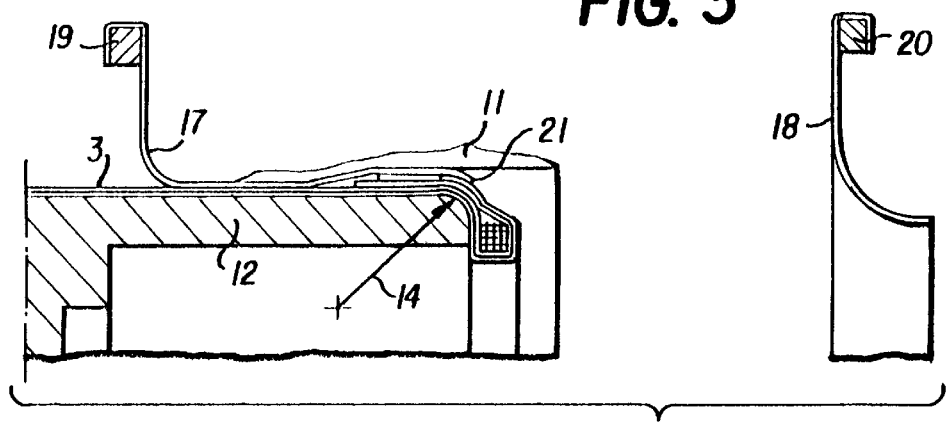

Now the free ends of the two strips of the sidewall (FIG. 4) are fixed on the carcass sleeve over the corresponding tubular elements and the assembly drum is rotated so as to drag and wrap onto the external surface of each element 17 the related tire sidewall 11, withdrawn from a special dispenser (not shown) arranged near the drum.

It is clear that the sidewall portion in direct contact with the carcass sleeve, i.e. the sidewall portion between the axially external edge of the tubular element and the axially external edge of the sidewall, may have a so narrow width as not to ensure that rotation of the drum will drag out and wrap the sidewall strip thereon, especially when, in accordance with the above mentioned preferred embodiment of the present invention, the edge of the element lies on the end of the drum.

In this case, before starting drum rotation, the free ends of the sidewalls are conveniently blocked on the sleeve with removable devices, known per se, e.g. of the clamp type, arranged on the drum shoulders preferably at axially opposed positions.

Figure 5:
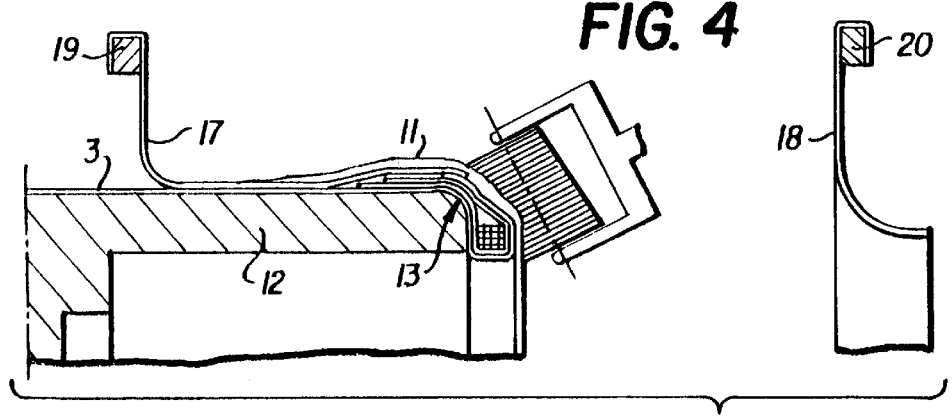

Upon completion of drum rotation and after having joined together the two sidewall ends, the sidewalls 11 (FIG. 5) are turned down on the drum shoulders 13, e.g. in accordance with solutions and by means of rolling devices which, being part of the prior art, are not further described in detail.

The carcass sleeve is now ready to be removed from the drum and sent to the forming step after removal of the tubular element and spreading apart of the sidewall as discussed below. However, in accordance with another preferred embodiment of the method according to the invention, another operating step is provided which is carried out on the assembly drum using the second tubular element mentioned above.

Figure 6:
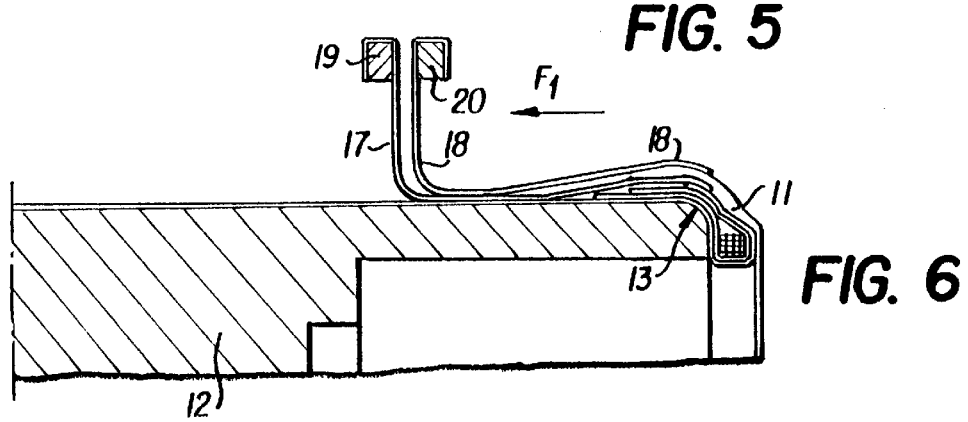

More specifically, the second tubular element 18 is displaced, according to an axial movement along arrow F1 shown in FIG. 6, towards the assembly drum until it is fitted on the outer surface of the sidewall 11 which in this manner is clamped between the couple of tubular elements 17, 18.

Clearly, this is made with both sidewalls, and the element 18 as well, which is fully equivalent to element 17, surrounds the sidewall with a slight pressure linked to the expansion (maximum value 10%) undergone during the step of fitting on the sidewall.

Figure 7:
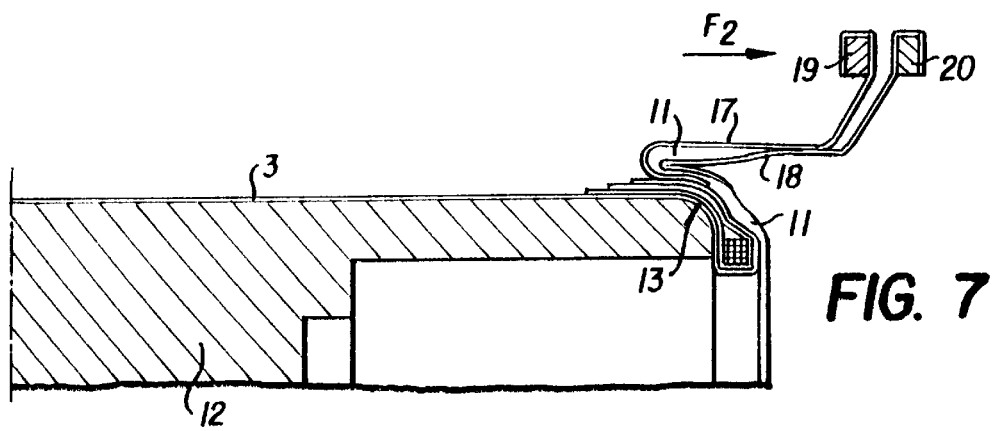

Next, in a further step and again in accordance with the invention, the means for axially moving the two tubular elements 17, 18 are operated simultaneously and axially towards the outside of the drum along the direction of arrow F2 shown in FIG. 7.

As shown in FIG. 7, the above mentioned axial movement of the tubular elements overturns the sidewall 11 axially towards the outside for the entire portion which could not adhere to the sleeve surface thanks to the interposition of the tubular element 17.

Figure 8:
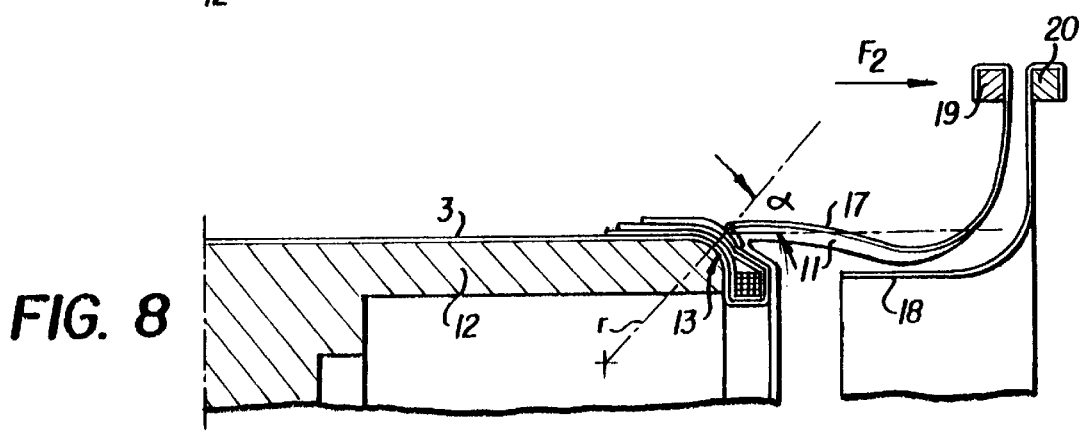

Advantageously, when the sidewall adheres to the sleeve only at the curvilinear connecting portion with the drum shoulders, according to the above mentioned preferred embodiment, upon overturning it takes on an essentially cylindrical configuration having a diameter corresponding to that of the drum as shown in FIG. 8, i.e. it is arranged according to an essentially stable configuration because its elastic memory can do nothing but compell said sidewall to return to the configuration it had upon deposition on the drum, i.e. a cylindrical configuration which is in practice aside and coaxial with the drum surface.

Figure 9:
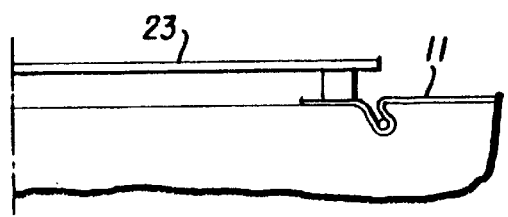
FIGS. 9 and 10 show, in two partial cross sections, the transfer, toric conformation and completion steps of the sleeve of FIG. 8.

The carcass sleeve having spread-apart sidewalls thus formed, is removed from the assembly drum after radial contraction of the same and transferred into the second-step operating area, preferably directly onto the second-step drum by means of a transferring apparatus 23 (FIG. 9) comprising adequate sleeve-supporting means known per se.

During the second-step operations and after rolling of the belt/tread band assembly against the carcass ply as described above, inflatable side chambers 28 overturn the sidewalls 11 on the carcass and on the side portions of the tread band and it is clear that the cylindrical form of the sidewalls obtainable by the method of the present invention allows to carry out this overturning in an optimal manner, without causing undesired deformation or irregular stretching of the sidewall.

The method of the present invention achieves the desired results.

First of all, it can be noted that the use of the second tubular element 18 in a position radially external to the sidewall is preferred but not essential, since spreading apart of the sidewall may already be achieved (FIG. 8) with the first tubular element 17.

Indeed, the tubular element, although being made of a releasing material insensitive to the stickiness of the green materials of the carcass sleeve, cannot be removed from beneath the sidewall following the axial movement towards the outside of the guide flange, since the axially internal end of the sidewall does not offer sufficient mechanical resistance to constitute a constraining element around which the tubular element could slip while revolving around itself: in conclusion, the overturning of the tubular element consequently causes overturning of the sidewall.

This overturning only allows expansion in a circumferential direction for the tubular element but does not involve elongation in an axial direction, which is prevented by the presence of the inextensible reinforcing elements of said element so that it ensures dimensional stability of the sidewall width, which sidewall cannot undergo stretching in the same direction in its overturning movement.

The preferred use of the second tubular element 18, in addition to facilitating overturning of the sidewall which is clamped between the two tubular elements, most favourably ensures that the overturning portion of the axially external surface of the sidewall does not touch the surface portion of the same sidewall still lying on the drum, since the two above mentioned portions of the same sidewall surface are separated by the tubular element 18.

Basically, the tubular element 18 acts as a lubricating substance with the result of allowing the sidewall 11 (FIG. 7) to freely slide towards the opening position shown in FIG. 8. The skilled in the art will have no difficulty in replacing the element 18, if preferred, with other alternative anti-adhesive means.

The weld line position between the sidewall and the sleeve at the curvilinear connection between the cylindrical surface and the drum shoulders is also to be considered as preferred, since a different position, in particular an axially more inward one, does not preclude to carry out a correct spreading apart of the sidewall in a uniform manner and without irregular stretching of the material: on the other hand, the spread-apart sidewall being arranged along a surface having a diameter greater than that of deposition on the drum, maintains an internal tension state which tends to close the axially outermost free end towards the drum rotation axis.

The use of tubular elements employed in the steps of the present method allows, as explained above, to abandon the conventional anti-adhesive elements in sheet form inserted between the carcass ply and the sidewalls during the manufacturing steps of the carcass sleeve.

Thus, the shortcomings of the prior art connected to scraps of such sheets (e.g. polyethylene) incorporated in the monolithic structure of the vulcanized tire are overcome.

In addition, thanks to the fact that the tubular element is re-usable for a great number of manufacturing cycles of tires of various sizes, the problems, not only environmental, caused by the use of ever new sheets of releasing material for each tire to be manufactured and by the need of disposing the same later at the end of the manufacturing cycle, are overcome.

More particularly, it is emphasized that one and the same tubular element, being radially extensible, may be employed for a large range of sleeves of different diameter, thus avoiding the need to change frequently equipment for different tire sizes.

In addition, the tubular elements being already prepared in the correct form instead of being in sheet form, may be connected to automatic displacing devices capable to insert and withdraw the tubular elements into and from a cylindrically-shaped body within the same, such as a carcass sleeve wrapped on an assembly drum.

The steps of applying the releasing and sidewall fold-back element, therefore, may advantageously be automated with a number of qualitative and economic benefits for the production process.

It is clear that the step of spreading apart the sidewall may be performed even after having disassembled the sleeve from the first-step drum by providing appropriate clamping and releasing means for the axially internal edge of the tubular elements from respective displacement flanges which allows to move the sleeve with the tubular elements still inserted therein.

Figure 10:
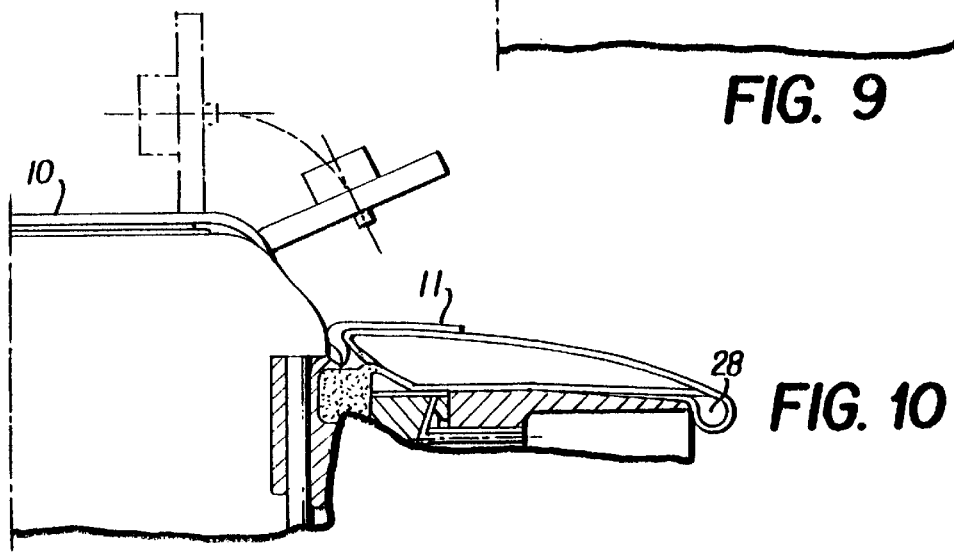

Advantageously, the method of the present invention allows to spread apart the sidewalls aside of the sleeve in a stable tubular form, substantially aligned with the assembly drum surface. Thanks to the above mentioned feature, the step of overturning the sidewalls performed on the forming drum against the toric carcass takes place correctly. The chambers 28 aside of the forming drum, in fact, are positioned (FIG. 10) below the surface of the sidewalls arranged in a stable and extended tubular configuration, free from curlings or similar irregularities.

During the overturning step, therefore, the chambers may gradually and regularly act on the sidewalls pressing them against the wall of the carcass and of the tread band.

Finally, it is clear that the present description has only an explanatory and non-limiting function so that those skilled in the art, after understanding the invention as described above, will be able to perform all those variations, modifications and replacements of the variables associated with the present invention for the purpose of satisfying specific requirements.

What is claimed is:

1. Apparatus for manufacturing a cylindrical sleeve-shaped tire carcass comprising at least one carcass ply provided with reinforcing cords having respective ends each folded back around at least one circumferentially inextensible bead wire and a tire sidewall fixed on each side portion of said sleeve, said apparatus comprising an assembly drum (12), rotating around its own axis, having a radially contractable, radially external cylindrical revolution surface, connected to two axially opposed external side surfaces through two curvilinear surfaces, means for turning down and folding back the ends of said plies on said side surfaces and means for setting bead wires against said side surfaces, said apparatus further comprising aside of each drum (12) end:

at least one tubular element (17), comprising a tubular part having a diameter not greater than the drum (12) diameter, coaxial with said drum, open as a funnel at one end, and made of a material extensible in a circumferential direction and inextensible in an axial direction, at least one annular flange, coaxial with the drum (12), having an internal diameter greater than the diameter of said drum, rotatably connected to the drum and axially movable in both directions with respect thereto, said annular flange being connected to the funnel-shaped end of said element, and means for axially moving said flanges.

2. Apparatus according to claim 1, it comprising, for each end of said drum, a couple (17, 18) of said tubular elements, each connected to a corresponding annular flange (19, 20).

3. Apparatus according to claim 2, wherein each element, having a funnel-shaped tubular form and unbroken surface, is made of a releasing material.

4. Apparatus according to claim 3, wherein said releasing material is a silicone-based rubber composition.

5. Apparatus according to claim 3, wherein said tubular elements comprise reinforcing means of releasing material arranged on at least one surface of said tubular elements.

6. Apparatus according to claim 3, wherein said tubular elements incorporate reinforcing means arranged in such a manner as to provide said extensibility in a circumferential direction and inextensibility in an axial direction.

7. Apparatus according to claim 6, wherein said element is made of a rubberized fabric cylinder reinforced with threads selected from the group comprising monofilaments, elementary threads and reinforcing cords, either textile or metallic, arranged in a mutually parallel manner according to the generating line of said cylinder.

8. Apparatus according to claim 6, wherein said element is made of a rubber tube incorporating reinforcing fibers selected from the group comprising axially-oriented textile, metallic or glass fibers.

* * * * *